Jan. 8, 1924.
N. G. COSMAN
1,480,151
GRASS CUTTER
Filed April 16, 1923
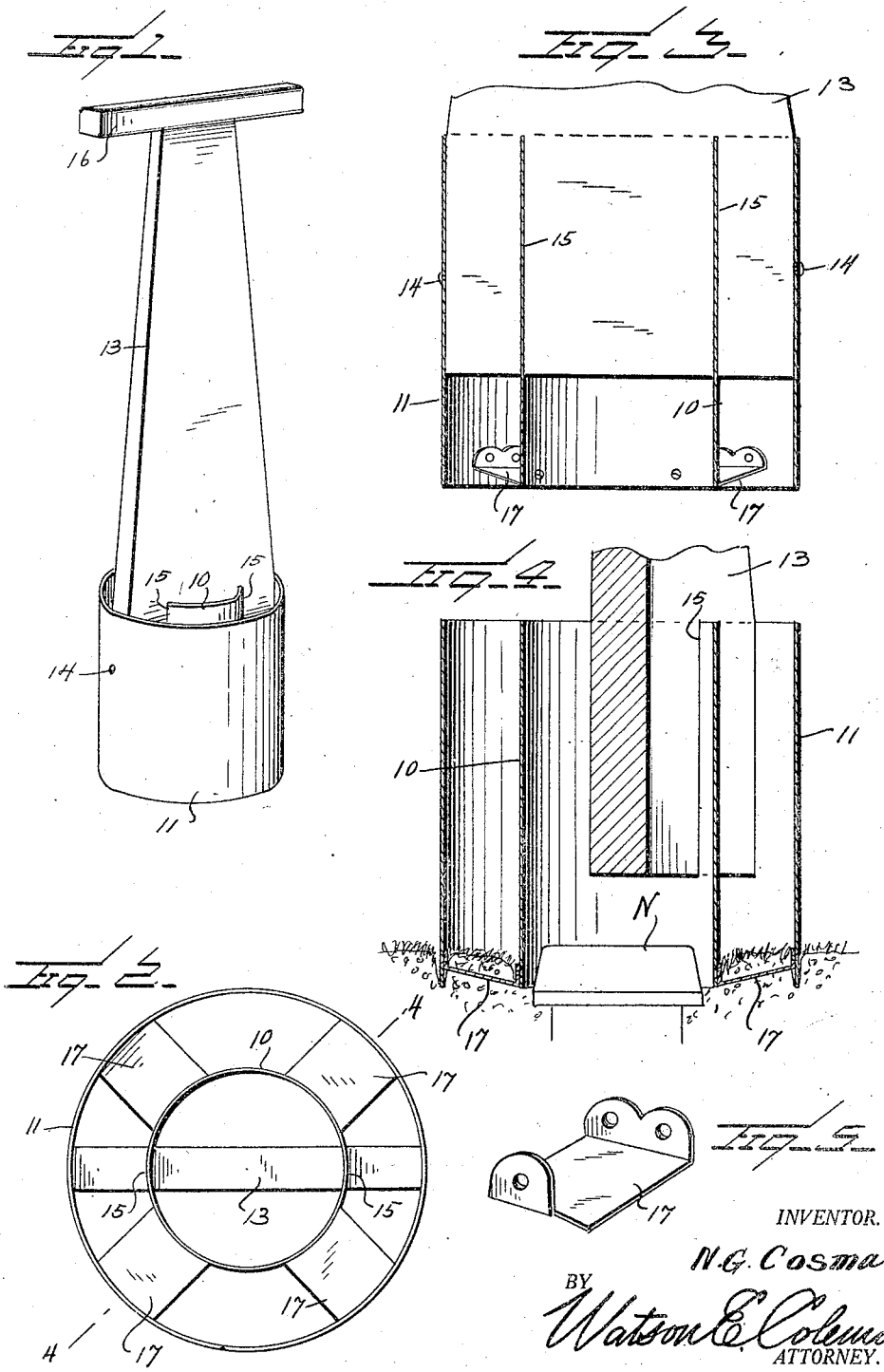
INVENTOR.
N.G. Cosman
BY
Watson E. Coleman
ATTORNEY.

Patented Jan. 8, 1924.

1,480,151

UNITED STATES PATENT OFFICE.

NATHAN G. COSMAN, OF CORONADO, CALIFORNIA.

GRASS CUTTER.

Application filed April 16, 1923. Serial No. 632,477.

*To all whom it may concern:*

Be it known that I, NATHAN G. COSMAN, a citizen of the United States, residing at Coronado, in the county of San Diego and State of California, have invented certain new and useful Improvements in Grass Cutters, of which the following is a specification, reference being had to the accompanying drawings.

This invention relates to grass cutters and the like.

An important object of the invention is to provide a device of this character particularly adapted for removing from the nozzles of automatic sprinklers grass which may have grown thereover. As is well-known to those familiar with the art in certain arid communities, where in order to maintain a fresh appearing lawn it is necessary that constant sprinkling be employed, it is a common expedient to bury in the lawn pipes to which are secured sprinkler heads, the sprinkler heads being so spaced as to direct their spray over the entire lawn. This arrangement operates considerably as a labor saving device but requires considerable attention due to the fact that the grass of the lawn has a tendency to grow over the nozzles of the sprayer choking the same and preventing proper operation thereof.

An important object of this invention is accordingly to provide a device whereby the grass about the sprayer head may be readily and neatly removed.

These and other objects I attain by the construction shown in the accompanying drawings, wherein for the purpose of illustration is shown a preferred embodiment of my invention and wherein:—

Figure 1 is a perspective view of a cutter constructed in accordance with my invention;

Figure 2 is a bottom plan view thereof;

Figure 3 is a transverse sectional view therethrough;

Figure 4 is a section on the line 4—4 of Figure 2; and

Figure 5 is a perspective of a blade detached.

Referring now more particularly to the drawings, the numerals 10 and 11 indicate concentric cylinders, the inner cylinder 10 being of a diameter to substantially fit the circumference of the nozzle N with which it is adapted to coact. The outer cylinder 11 is of any desired diameter and has its lower end preferably arranged in the same plane as the lower end of the inner cylinder 10 for a purpose to presently appear. These cylinders are held in concentric relation by a handle 13 of a width substantially equal to the internal diameter of the outer cylinder 11 extending into the outer cylinder and secured thereto at its opposite sides at diametrically opposed points in the cylinder, as indicated at 14. The handle has formed in its lower end vertically extending slots 15 so spaced as to receive the upper end of the inner cylinder 10 at diametrically spaced points, thus maintaining the upper end of the cylinder 10 in properly spaced relation to the cylinder 11. The upper end of the handle 13 is provided with a cross piece 16 for engagement with the hand. At their lower ends the cylinders 10 and 11 are connected and spaced by preferably radially extending blades 17, so secured to the cylinders 10 and 11 that their inner ends are in the plane of the lower end of the cylinder 10 and their outer ends are vertically spaced above the lower end of the cylinder 11 a short distance.

In the use of the device the inner cylinder is placed over the nozzle from about which it is desired to remove the grass and the device revolved by means of the hand grip 16. The lower end of the cylinder 10 coming into contact with the turf will cut from the turf a circular patch concentric with the nozzle end and the turf of this patch will be removed by the blade 17. These blades 17 may be secured to the cylinders 10 and 11 in any desired manner, being shown in the present instance as detachably secured so that they may be removed for sharpening or replacement. It will be obvious that the structure of the device as hereinbefore set forth is capable of some change and modification without materially departing from the spirit of my invention and I accordingly do not limit myself to such specific structure except as hereinafter claimed.

I claim:—

1. In a device of the type described, concentric cylinders having their lower ends arranged in approximately the same plane, a handle connecting the upper ends of the cylinders and maintaining the same in concentric relation and radially directed blades connecting the lower ends of the cylinders.

2. In a device of the type described, concentric cylinders having their lower ends arranged in approximately the same plane, a handle connecting the upper ends of the cylinders and maintaining the same in concentric relation and radially directed blades connecting the lower ends of the cylinders, the outer ends of said blades being vertically spaced above the lower end of the outer cylinder, the inner ends of said blades being arranged in the plane of the lower end of the inner cylinder.

3. In a device for removing grass about spray nozzles, inner and outer concentric cylinders having their lower ends arranged approximately in the same plane, the inner cylinder being of a diameter substantially equal to the diameter of the nozzle, radially extending blades connecting the lower ends of the cylinders and a flat handle of a diameter equal to the internal diameter of the external cylinder extending into the upper end of the cylinder and secured thereto at its sides at diametrically opposed points, said handle having formed in the lower end thereof vertically extending slots receiving the upper end of the inner cylinder at circumferentially spaced points.

In testimony whereof I hereunto affix my signature.

NATHAN G. COSMAN.